Patented Apr. 5, 1949

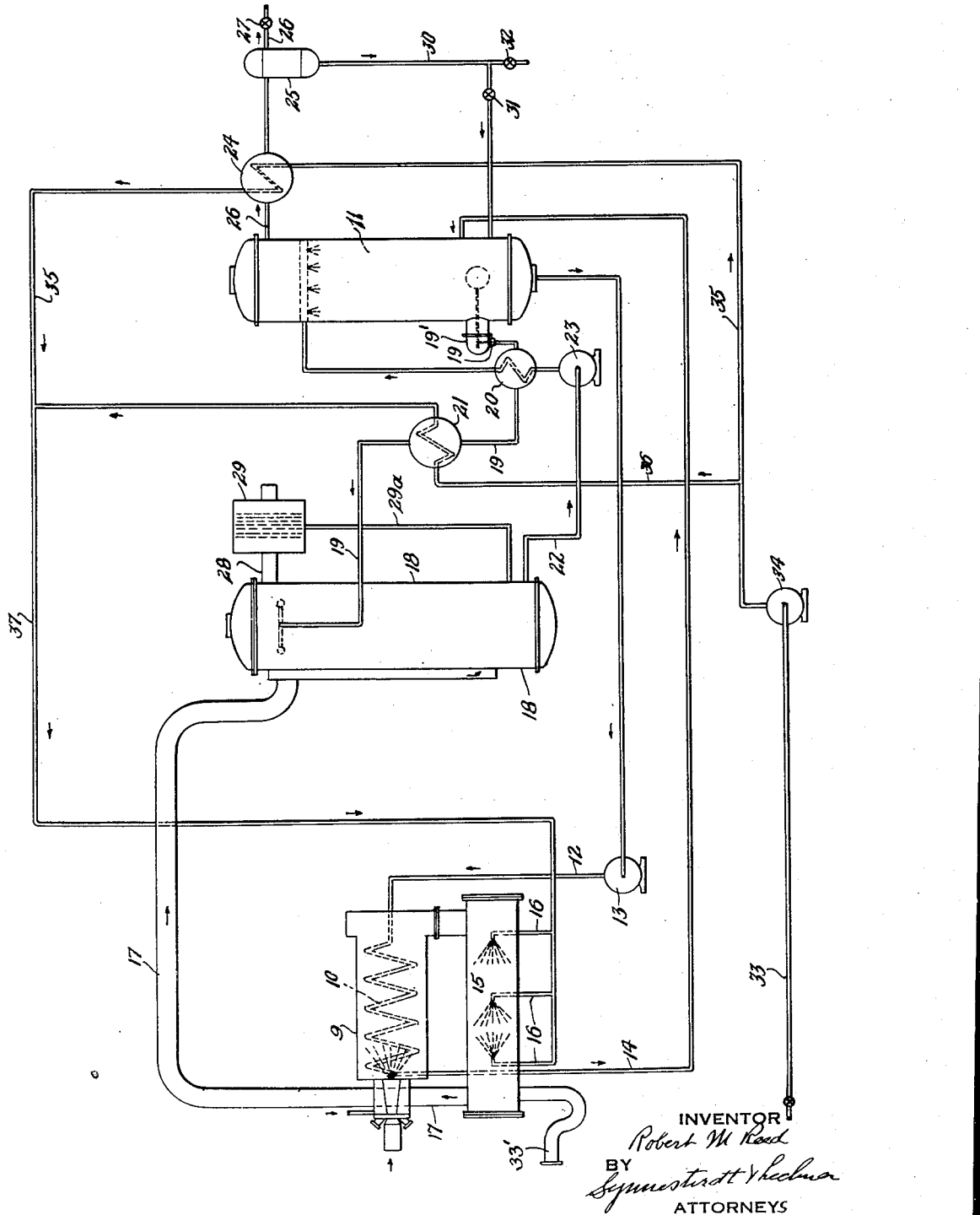

2,466,183

UNITED STATES PATENT OFFICE 2,466,183

METHOD OF AND APPARATUS FOR THE SEPARATION OF ACIDIC GASES FROM GASEOUS MIXTURES

Robert M. Reed, Louisville, Ky., assignor to The Girdler Corporation, Louisville, Ky., a corporation of Delaware Application March 26, 1946, Serial No. 657,215

17 Claims. (Cl. 23—2)

This invention relates to the separation of an acidic gas or acidic gases from a gaseous mixture containing the same, and one of its primary objects is to provide a simple and effective method and apparatus for effecting the separation.

Another object of the invention is to provide a method and apparatus whereby relatively large capacity can be obtained with relatively small and inexpensive equipment. The installation may be a self-contained one, generating its own supply of gaseous mixture, or the equipment may be associated with existing or new installations in which the gaseous mixtures to be separated are a waste or by-product of some other operation. In the case of the former, the invention is such that the installation may be portable.

While, as will further appear, the invention is useful for the separation of various acidic gases from a gaseous mixture through the medium of solutions of various absorbing agents or mediums, it will be described as used for the separation of carbon dioxide ($CO_2$), utilizing monoethanolamine in aqueous solution as the absorbing agent.

One manner of carrying out the invention is shown in the accompanying drawing, which is a diagrammatic view illustrating the principles of the method and one form of portable apparatus suitable for the practice of the invention.

The separation of acidic gases from gaseous mixtures is well known and is illustrated, for example, in the Reissue Patent No. 18,958 to R. R. Bottoms, and Patent No. 2,012,587, issued to F. B. Hunt. In the systems therein shown, the gaseous mixture is delivered into the lower portion of an absorbing tower to rise in contacting counterflow with an aqueous solution containing an absorbing agent, which is admitted into the upper portion of the tower to descend therein. The "lean" solution entering the top of the tower and descending therein, absorbs the acidic gas from the ascending gaseous mixture, and the "rich" solution (solution now containing absorbed acidic gas) collects in the bottom of the tower and is continuously led to the upper portion of a regenerator or reactivator such as a tower, to descend therein in contacting counterflow with steam to effect the regeneration of the rich solution, i.e., to strip from the rich solution the absorbed acidic gas. To this end heat is supplied to generate the steam for the stripping. In the two patents referred to the heat is supplied by a steam heated coil in the bottom portion of the regenerator. The stripped or regenerated solution (now lean) is continuously returned to the absorbing tower. The vapors rising in the regenerator and containing the separated acidic gas, are discharged from the top of the regenerator and are then subjected to cooling to separate the acidic gas by the condensation of the undesired portions of the vapor, after which the separated gas may be vented or subjected to purification, liquefaction or other operations to produce the desired end product. In the systems of the patents referred to above the entire aqueous solution employed, is circulated from the regenerator to the absorbing tower and back to the regenerator and the regenerator is employed under substantially atmospheric pressure.

In accordance with my invention, however, I employ a larger volume of absorbing solution than is required for absorption purposes, and I continuously circulate lean solution from the regenerator through a heater (located so as to be subject to the gaseous mixture in a zone of high temperature), and back to the regenerator, while at the same time I continuously lead lean solution from the regenerator to the absorber and return it as rich solution to the regenerator. I thus utilize the solution circulated through the heater to supply the heat (and steam) needed for regenerating the rich solution returning from the absorbing tower to the regenerator for stripping. The lean solution circulated through the heater is brought to a temperature in the heater at which it will later boil in the regenerator and is returned to the bottom portion of the regenerator. The steam thereby formed rises in the regenerator in contacting counterflow with the descending rich solution and brings about the desired stripping. The regenerated solution (now lean) passes into heat exchange with and preferably mingles with the lean solution returned to the regenerator from the heater.

In a preferred form of the invention, the heater is located either directly in the region in which the gaseous mixture is generated or in a region in which the mixture still contains a major part of the heat of combustion evolved during the generation of the gases. Moreover, as will later be explained, the preferred form of the invention employs a regenerator operating under superatmospheric pressure as well as a positive circulation of lean solution, preferably under superatmospheric pressure, between said regenerator and the heater.

It will be seen from the foregoing that I directly employ heat evolved in the generation of the gaseous mixture to heat lean solution and thus supply the heat and steam for the stripping of the rich solution.

Referring now to the accompanying drawing, the reference numeral 9 indicates a combustion chamber into which a suitable fuel, such as oil, gas, or powdered coal, and the air required for combustion thereof, are admitted and the fuel there burned. The gases generated include a substantial amount of $CO_2$. Located within the high temperature zone of this furnace is a heating coil 10, one end of which is connected to the bottom portion of the regenerator 11 by means of a delivery pipe line 12, in which is located a pump 13. The other end of the heating coil is connected by a return pipe line 14 with the bottom portion of the regenerator. By this arrangement lean solution in the lower portion of the regenerator is being continuously pumped to the heater and this solution, after receiving heat in the heating coil, is returned to the said lower portion of the regenerator. In the heater the solution is raised to a temperature at which it will later boil in the regenerator. In the case of $CO_2$ separation, I prefer to use an aqueous solution of monoethanolamine for absorption purposes, the solution desirably having a concentration of from about 5% to about 40%, a 15% solution being preferred.

In the preferred embodiment this solution passing through the heating coil is maintained under a superatmospheric pressure to enable it to absorb more heat without substantial boiling in the coil or in the lines 12 and 14. Moreover, when operating the regenerator 11 under superatmospheric pressure the solution necessarily is under an equivalent pressure in leaving and entering the base of that regenerator.

The hot gaseous mixture leaving the furnace chamber 9 after giving up a large portion of its heat to the solution enters a cooling chamber 15, wherein it is subjected to water sprays delivered thereinto by the nozzles 16 which further cool the gaseous mixture to a temperature suitable for introduction into the absorbing tower 18, such, for example, as 100° F. The cooled gases leave the chamber 15 by means of the pipe 17 and are discharged into the lower portion of the absorbing tower 18 to rise in counterflow with the descending "lean" or regenerated absorbing solution which is supplied from the lower portion of the regenerator by means of the pipe line 19. Two heat exchangers 20 and 21 are located in line 19 and serve to cool the lean solution flowing from the regenerator to the upper portion of the absorbing tower, say, for example, to a temperature of 100° F. The absorbing tower may be of any conventional design and may be provided with trays, Raschig rings, or the like (not shown). In descending in the absorbing tower, the lean solution absorbs carbon dioxide from the gaseous mixture delivered into the absorber by pipe 17.

The "rich" solution collecting in the bottom of the absorbing tower is pumped to the top of the regenerator through pipe line 22 by means of pump 23, to descend in counterflow with the steam rising from the hot solution in the bottom of the regenerator. Thus the heat and steam required for regeneration or stripping is supplied by lean solution which is being continuously pumped from the bottom of the regenerator into the heater 10 and returned. The regenerator like the tower, may be of conventional construction and may be provided with trays, Raschig rings, or the like (not shown).

It will be noted that in the preferred embodiment the superatmospheric pressure in the regenerator is effective to move the lean solution from the regenerator to the absorber without the employment of a separate pump. However, the use of a pump and the operation of the regenerator at substantially atmospheric pressure as taught by Bottoms and Hunt may be had without departing from the broader scope of the invention.

The lean, i. e., stripped or regenerated solution reaching the lower part of the regenerator, mingles with the hot lean solution pumped into the regenerator from the heater; and the vapors rising to the upper end of the regenerator contain the carbon dioxide which has been stripped from the rich solution descending therein, and are discharged from the upper portion of the regenerator via the pipe line 26, passing first through a cooling heat exchanger 24 and then through a reflux accumulator 25, wherein the water vapors are condensed.

Any desired disposition may be made of the separated gas leaving pipe line 26. It may be vented or may be subjected to further treatment. Since the preferred embodiment contemplates that it will be under a pressure of about 30 to 40 pounds per square inch gauge, substantial savings in size and cost of operation of compressors will be realized in those installations in which it may be subjected to liquefaction treatment.

As will be noted, the system contains a considerably larger volume of solution than is required merely for absorption purposes. The portion of the lean solution from the bottom of the regenerator is led to the absorber at a lower rate than the portion of the lean solution which is pumped through the heater 10. By way of illustration, in one commercial installation treating a $CO_2$ containing gas with a 15% monoethanolamine solution, lean solution is led from the regenerator to the absorbing tower at a rate of approximately 10 gallons per minute, and the other portion of the lean solution is led from the regenerator to the heater at a rate of approximately 40 gallons per minute, i. e., at a ratio of about one to four.

In this installation the temperature of the gaseous mixture in the furnace was about 1000° F. to about 1100° F. and the temperature of the lean solution returning to the regenerator from the heater 10 was about 300° F., while at the same time the pressure in the regenerator was about 30 to 40 pounds per square inch gauge. While the ratio of volumes of solution and the exact temperatures employed are not critical and are given only by way of illustration, nevertheless it has been determined that for establishing and maintaining a satisfactory heat balance in the system the portion of the absorbent solution circulated through the heater should be larger than the portion of the solution circulated through the absorber. It is desirable to minimize the amount of boiling of the absorbent solution in the heater 10 or in lines 12 and 14 and to concentrate the boiling action in the lower portion of the regenerator. When using an organic absorbent solution such as monoethanolamine, decomposition of the same may occur at high temperatures with the resultant formation of a corrosive solution. Any dead spaces in heater 10 in which the solution or gas therefrom remains too long in contact with hot surfaces may give rise to this condition. Accordingly I propose to move the solution through the heater rapidly enough to prevent this condition while at the same time retaining it in said heater long enough to take up sufficient heat to insure adequate boiling in the regenerator. By continuously moving the greater portion of the lean solution through the heater under a pressure which inhibits boiling at lower temperatures as by the action of pump 13, it is possible to carry the required amount of heat from the heater to the regenerator and simultaneously to prevent the decomposition by heat of the organic absorbent. In the event the pressure in the reactivator is substantially atmospheric, as is feasible when the separated acidic gas is not delivered under pressure, the solution passing through the heater may be moved fast enough to prevent decomposition and may be at substantially atmospheric pressure. However, in this case even more solution will be required to transfer the required amount of heat to the reactivator and its ratio to the amount of solution circulating through the absorber will be larger.

As above indicated, numerous advantages result from the operation of the regenerator under superatmospheric pressure particularly when the separated acidic gas, such as $CO_2$, is to be subjected to further treatment. The back pressure regulating valve 27 in outlet pipe 26 is provided to maintain the desired operating pressure and cooperates with the pump 13 and the steam evolved in regenerator 11 to insure the maintenance of the pressure. This valve may be of any desired construction operating in a conventional manner to regulate the back pressure. The pipe 26 leads the separated gas to any suitable point of disposal. When the gas, such as $CO_2$, is to be further treated it may be led to any conventional purification and treatment apparatus (not shown). Such apparatus may include, for example, permanganate scrubbers, a compressor, and such ancillary equipment as is needed to produce $CO_2$ in desired end form, such, for example, as liquid $CO_2$. Such apparatus forms no part of the present invention.

With this pressure operation of the regenerator, regenerated or lean solution is caused to flow from the bottom of the regenerator through pipe 19 into the absorbing tower without the necessity of employing separate pumping means. Flow through pipe 19 is controlled by the liquid level controlled valve indicated as a whole by reference character 19 and operable in a conventional manner. This valve will ensure adequate overflow to the absorber and will also tend to maintain the desired level of liquid in the regenerator. Pump 23 serves to return the "rich" solution from the absorbing tower to the regenerator against this pressure.

The effluent or stripped gas passes from the absorbing tower to the stack (not shown) by means of the pipe 28. It is first passed through a mist separator 29 from which the liquid collecting therein may be returned to the bottom of the absorbing tower, as by means of the pipe 29a.

The condensate from the reflux accumulator 25, which condensate contains a small fractional percentage of absorbent medium, may be returned to the bottom of the regenerator by means of pipe 30 or discharged to waste, to which end the valves 31 and 32 are provided.

The water or other liquid utilized to cool the gases in cooling chamber 15 preferably passes out of the system through overflow 33[1] and additional cooling medium is continuously introduced through pipe 33 and pump 34 from any convenient source. Part of the discharge of cooling medium from the pump 34 divides, a portion being led to the heat exchanger 24 by means of pipe 35, and a portion being led through the heat exchanger 21 by pipe 36. Pipes 35 and 36 discharge into pipe 37 which supplies the nozzle 16.

The exchangers 20 and 21 reduce the temperature of lean solution leaving the bottom of regenerator via pipe 19 to the desired temperature for introduction into the absorbing tower. This desirably is about 100° F., when the acidic gas to be separated is $CO_2$ and the absorbing agent is monoethanolamine.

From what has been said, it will be seen that the method and apparatus are simple, effective and efficient. The system is essentially a closed one and the losses are comparatively small.

The invention is not limited to the separation of $CO_2$ nor to the use of monoethanolamine. It is useful in connection with the separation of other acidic gases and also with other absorbing agents, such, for example, as those set forth in the said Bottoms patent.

I claim:

1. In the process of separating acidic gas from a heated gaseous mixture containing the same, in which said gaseous mixture is contacted in an absorber with a lean acidic gas absorbent solution and the resulting rich solution is regenerated at a pressure at least equal to that of the atmosphere with the action of heat to liberate the acidic gas therefrom, the steps of continuously conducting a first portion of the lean solution from a regenerator to said absorber for contact with the gaseous mixture in the latter and returning the resultant rich solution to the regenerator, simultaneously continuously conducting a second portion of the lean solution from the regenerator into indirect heat exchange relation with the gaseous mixture prior to treatment of that mixture in the absorber, thereby to heat said second portion of the solution, and returning said second portion of the solution to the regenerator into heat exchange relation with the first portion of the solution and utilizing in the regeneration of the rich solution the heat carried from said gaseous mixture by the second portion of the solution, the temperature of the heated gaseous mixture being sufficient to raise the temperature of the lean solution at least to the point where it will boil in the regenerator at the pressure of operation.

2. The process of claim 1 in which the temperature of the heated gases is of the general order of from 1000° F. to 1100° F. and in which the first portion of the solution is mingled with the second portion of the solution.

3. The process of claim 1 in which the amount of the second portion of the solution is greater than the amount of the first portion of the solution and is caused to flow so rapidly in its heat exchange relationship with the gaseous mixture as to prevent substantial decomposition of the absorbent.

4. The process of claim 1 in which the second portion of the solution is in amount at least several times that of the said first portion and in which the pressure of the said second portion is maintained at a value in its heat exchange relationship with the gaseous mixture sufficiently high to prevent boiling.

5. The process of claim 1 in which the gaseous mixture is cooled after passing in heat exchange relation with the second portion of the solution and before entering the absorber.

6. In the process of separating acidic gas from a heated gaseous mixture containing the same, in which said gaseous mixture is contacted in an absorber with a lean acidic gas absorbent solution and the resulting rich solution is regenerated with the action of heat to liberate the acidic gas therefrom, the steps of continuously conducting a first portion of the lean absorbent solution from a regenerator operating at a pressure at least equal to that of the atmosphere to said absorber for contact with the gaseous mixture in the latter at a pressure at least equal to that of the atmosphere and returning the resultant rich solution to the regenerator, simultaneously continuously conducting a second portion of the lean solution into indirect heat exchange relation with the gaseous mixture prior to treatment of that mixture in the absorber and while that mixture contains the heat of combustion evolved during the generation of the mixture, thereby to heat said second portion of the solution, and returning said second portion of the solution to the regenerator into heat exchange relation with the first portion of the solution and utilizing in the regeneration of the rich solution the heat carried from said gaseous mixture by the second portion of the solution, the temperature of the heated gaseous mixture being sufficient to raise the temperature of the lean solution at least to the point where it will boil in the regenerator at the pressure of operation.

7. The process of claim 6 in which the second portion of the solution passes in heat exchange relation with the gaseous mixture in the zone in which said gaseous mixture is generated.

8. In the process of separating acidic gas from a heated gaseous mixture containing the same, in which said gaseous mixture is contacted in an absorber with a lean acidic gas absorbent solution and the resulting rich solution is regenerated with the action of heat to liberate the acidic gas therefrom under a superatmospheric pressure, the steps of continuously conducting a first portion of the lean solution from a regenerator maintained under superatmospheric pressure to said absorber for contact with the gaseous mixture in the latter and returning the resultant rich solution to the regenerator, simultaneously continuously conducting a second portion of the lean solution from the generator into heat exchange relation with the gaseous mixture prior to treatment of that mixture in the absorber, thereby to heat said second portion of the solution, and returning said second portion of the solution under superatmospheric pressure to the regenerator in heat exchange relation with the first portion of the solution, and utilizing in the superatmospheric pressure regeneration of the rich solution the heat carried from said gaseous mixture by the second portion of the solution, the temperature of the heated gaseous mixture being sufficient to raise the temperature of the lean solution at least to the point where it will boil in the regenerator at the pressure of operation.

9. The process of claim 8 in which the regenerator is operated under a pressure sufficiently above atmospheric to cause the first portion of the solution to flow to the absorber.

10. The process of claim 8 in which the regenerator is operated at a pressure of the general order of from about 30 to 40 pounds per square inch gauge.

11. In the process of separating carbon dioxide from a heated gaseous mixture containing the same, in which said gaseous mixture is contacted in an absorber with a lean aqueous solution of an organic base and the resulting rich solution is regenerated with the action of heat to liberate the carbon dioxide therefrom, the steps of continuously conducting a first portion of the lean solution from a regenerator operating at a pressure at least equal to that of the atmosphere to said absorber for contact with the gaseous mixture in the latter at a pressure at least equal to that of the atmosphere and returning the resultant rich solution to the regenerator, simultaneously continuously conducting a second portion of the lean solution from the regenerator into indirect heat exchange relation with the gaseous mixture prior to treatment of that mixture in the absorber, thereby to heat said second portion of the solution, and returning said second portion of the solution to the regenerator into heat exchange relation with the first portion of the solution and utilizing in the regeneration of the rich solution the heat carried from said gaseous mixture by the second portion of the solution, the temperature of the heated gaseous mixture being sufficient to raise the temperature of the lean solution at least to the point at which it will boil in the regenerator at the pressure of operation.

12. Apparatus for separating acidic gas from a gaseous mixture containing the same comprising, conduit means for supplying heated gaseous mixture substantially at the temperature of its generation, an absorber connected thereto, a regenerator adapted to contain a body of absorbing solution, a line for delivering lean solution from the regenerator to the absorber, a return line for conducting rich solution from the absorber to the regenerator, a heater located in the stream of said heated gaseous mixture, a cooler for the heated gaseous mixture located intermediate the absorber and the heater, a line for delivering lean solution from the regenerator to the heater, a return line for conducting lean solution from the heater to the regenerator and means for pumping the solution from the absorber to the regenerator and between the regenerator and the heater.

13. Apparatus for separating acidic gas from a gaseous mixture containing the same comprising, a furnace for the burning of fuel and the generation of the gaseous mixture, a heater located in the stream of gaseous mixture at a point where said mixture contains the heat of combustion evolved during the generation of said mixture, an absorber, conduit means connected to said furnace and to said absorber for delivering the gaseous mixture generated in the furnace to the absorber, a regenerator adapted to contain a body of absorbing solution, a cooler means for cooling the gaseous mixture located in said conduit means at a point between the heater and the absorber, a pipe line for delivering lean solution from the regenerator to the absorber, a return pipe line for conducting rich solution from the absorber to the regenerator, a pipe line for delivering lean solution from the regenerator to the heater, a return pipe line for conducting lean solution from the heater to the regenerator, and means for pumping the solution from the absorber to the regenerator and from the regenerator to the heater.

14. Apparatus for separating acidic gas from a heated gaseous mixture containing the same and delivering the same under pressure comprising, a furnace for generating the heated gaseous mixture, an absorber, conduit means connected to the furnace and the absorber, a regenerator adapted to contain a body of absorbing solution, a pipe line for delivering lean solution from the regenerator to the absorber, a return pipe line for conducting rich solution from the absorber to the regenerator, a heater in the stream of said heated gaseous mixture located at a point where said mixture substantially contains the heat of its generation, a cooling means for cooling the gaseous mixture located between said heater and said absorber, a pipe line for delivering lean solution from the regenerator to the heater, a return pipe line for conducting rich solution from the heater to the regenerator, pressure regulating means for maintaining the regenerator under superatmospheric pressure, and means for pumping the solution from the absorber to the regenerator and from the regenerator to the heater.

15. In the process of separating acidic gas from a heated gaseous mixture containing the same, in which said gaseous mixture is contacted in an absorber with a lean acidic gas absorbent solution and the resultant rich solution is regenerated with the action of heat to liberate the acidic gas therefrom, the steps of generating the gaseous mixture, leading the gaseous mixture to the absorber, continuously conducting a first portion of the lean solution from a regenerator operating at a pressure at least equal to that of the atmosphere to said absorber for contact with the gaseous mixture in the latter and returning the resultant rich solution to the regenerator, simultaneously continuously conducting a second portion of the lean solution from the regenerator into indirect heat exchange relationship with the gaseous mixture prior to treatment of that mixture in the absorber, thereby to heat said second portion of the solution, returning said second portion of the solution to the regenerator in heat exchange relationship with the first portion of the solution and utilizing in the regeneration of the rich solution the heat carried from said gaseous mixture by the second portion of the solution, and cooling the gaseous mixture after it has passed in heat exchange relationship with said second portion and prior to its introduction into the absorber, the temperature of said gaseous mixture being sufficient to raise the temperature of the lean solution at least to the point at which it will boil in the regenerator at the pressure of operation.

16. Apparatus for separating acidic gas from a gaseous mixture containing the same by the use of an absorbing solution, comprising, in combination with a furnace for generating such gaseous mixture by fuel combustion, an absorber adapted to receive such gaseous mixture from the furnace and to bring the gaseous mixture into contact with the absorbing solution, a water spray cooler for gaseous mixture interposed in the path of feed of such mixture from the furnace to the absorber, and a regenerator adapted to receive rich solution from the absorber, to strip the rich solution and to deliver lean solution to the absorber; a heater for lean absorbing solution, said heater having inlet and outlet connections both coupled with the regenerator, and said heater being disposed for heat transfer with the gaseous mixture in advance of entrance of such mixture into the water spray cooler.

17. In the art of separation of acidic gases from a gaseous mixture containing the same according to the method wherein such gaseous mixture is generated by fuel combustion and is brought into contact with a lean absorbing solution, wherein the gaseous mixture is cooled by a water spray in advance of contact with the absorbing solution, and wherein rich absorbing solution is regenerated and resulting lean solution is recirculated in contact with such gaseous mixture; the step of circulating regenerated absorbing solution in indirect heat exchange relation with such gaseous mixture in advance of the water spray cooling thereof and intermingling the thus heated absorbing solution with lean solution in the region of solution regeneration.

ROBERT M. REED.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 2,242,323 | Powell | May 20, 1941 |
| 2,379,076 | Gollmar | June 26, 1945 |